(12) United States Patent
Diggle, III et al.

(10) Patent No.: US 7,003,891 B1
(45) Date of Patent: Feb. 28, 2006

(54) COMPACT MITER APPARATUS

(75) Inventors: Frederick Diggle, III, Mountain Brook, AL (US); Paul Rivers, Cullman, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/963,244

(22) Filed: Oct. 12, 2004

(51) Int. Cl.
*B43L 7/12* (2006.01)

(52) U.S. Cl. ............................. 33/471; 33/465; 33/424

(58) Field of Classification Search .................. 33/1 N, 33/423, 424, 465, 466, 471, 534, 633, 640, 33/641, 418
See application file for complete search history.

(56) References Cited

U.S. PATENT DOCUMENTS

| | | | | |
|---|---|---|---|---|
| 1,857,129 A | * | 5/1932 | Ahola | 33/465 |
| 4,481,720 A | * | 11/1984 | Sury | 33/471 |
| 4,611,407 A | * | 9/1986 | van Gorp | 33/471 |
| 4,901,444 A | * | 2/1990 | Maschmeier | 33/423 |
| 6,672,190 B1 | * | 1/2004 | Taylor | 33/471 |
| 6,691,423 B1 | * | 2/2004 | Fontaine | 33/640 |
| 6,796,047 B1 | * | 9/2004 | Arnott | 33/465 |
| 2002/0189121 A1 | * | 12/2002 | Fontaine | 33/640 |
| 2004/0172841 A1 | * | 9/2004 | Larsson | 33/471 |
| 2004/0216316 A1 | * | 11/2004 | Ellis et al. | 33/471 |

* cited by examiner

*Primary Examiner*—G. Bradley Bennett
(74) *Attorney, Agent, or Firm*—Merchant & Gould

(57) ABSTRACT

A miter apparatus is for making beveled cuts in a workpiece such as a board or the like. A base defines a seat for placing against an edge of the workpiece, and a guide member is pivotably attached to the base for adjustment to any desired angle of a beveled cut. Side surfaces of the guide member provide a bearing surface against which one side of a conventional handsaw may move to guide the saw while cutting the workpiece at the desired angle. A knob selectably secures the to guide member the base, and a surface on the knob provides an additional bearing surface for guiding the saw.

15 Claims, 5 Drawing Sheets

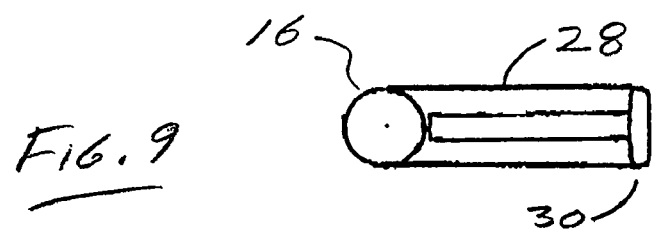
Fig. 9
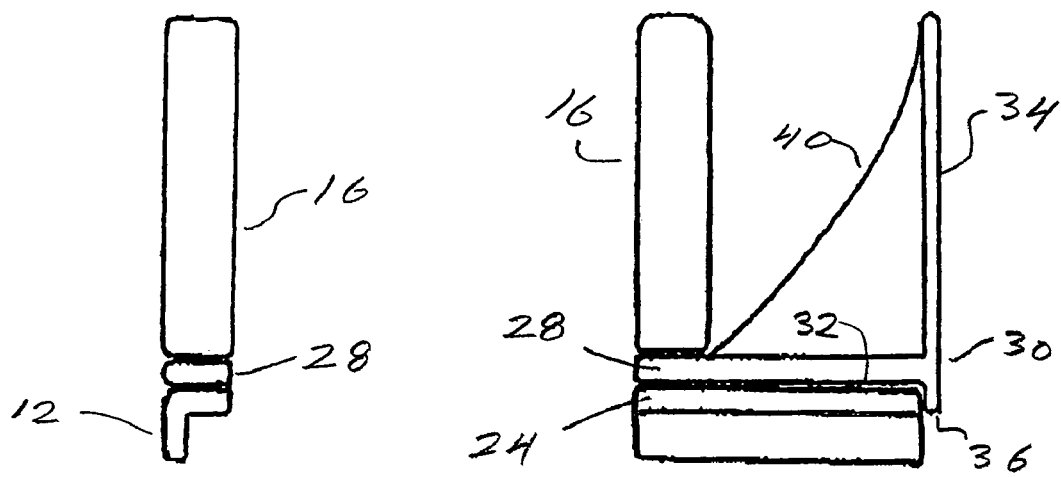
Fig. 7
Fig. 8

COMPACT MITER APPARATUS

FIELD OF THE INVENTION

This invention relates in general to apparatus for guiding miter cuts in a workpiece, and relates in particular to relatively compact apparatus for assisting miter cuts in workpieces such as boards or the like.

BACKGROUND OF THE INVENTION

A miter joint is a joint made by beveling each of two surfaces to be joined, for example at a 45° angle, to form a corner the included angle of which is the sum of the two bevel angles. Two commonplace examples of miter joints are found in the trim molding placed at the upper ends of walls in many rooms, and at the corners of picture frames. Miter joints provide a finished and esthetically-pleasing appearance and may improve the structural strength or rigidity of the joined pieces in some applications.

In order to produce an effective miter joint, it is necessary to cut the pieces being joined along a proper angle. For example, if the pieces join each other to form a right angle, each piece must be mitered along a 45° angle; any significant deviation from the desired angle when cutting either piece will result at best in a miter joint having a sloppy or unsightly appearance, and at worst in a defective piece that cannot be used for the intended purpose.

Carpenters typically use miter boxes for guiding a saw at the proper angle while making beveled cuts in boards. A typical miter box may be described as a U-shaped box of wood or plastic, open at the ends and having pre-cut guide grooves in the sides to guide a saw blade at selected angles of cut. A sacrificial baseboard is placed in the bottom of the miter box to protect the bottom and the teeth of the saw blade, and then a workpiece is laid in the box and held tightly against one side of the box. A beveled cut is then made using the guide slots at the desired angle.

Although miter boxes are commonplace for use by carpenters, problems are associated with their use. For one thing, commercially-available miter boxes usually are limited to cuts of 90°, 60°, 45° and 30°. Furthermore, miter boxes are relatively bulky and seldom at hand for the user. Such boxes typically have a dusty, cut-up bottom board in them, and the guide slots in the sides of the miter box are quickly widened by the back-and-forth cutting movement of handsaws through the guide slots. This widening of the guide slots means that the miter box becomes less precise in guiding a miter joint of the desired angle, leading to the eventual need to discard and replace a worn-out miter box.

Radial-arm saws allow infinite cut-angle settings for producing miter joints. However, such saws are expensive and require electricity to operate, and thus are not practical for the casual user or for someone preferring a portable miter tool.

BRIEF SUMMARY OF THE INVENTION

It is an object of the present invention to provide an improved apparatus for making miter joints or beveled cuts in workpieces.

It is a further object of the present invention to provide miter joint apparatus that is relatively portable and inexpensive, and can be readily at hand for the user.

It is a further object of the present invention to provide portable and simple miter joint apparatus capable of guiding beveled cuts along an infinite number of cut angles.

Stated in general terms and with reference to a disclosed embodiment of the present invention, an apparatus is disclosed for guiding a tool operating on a workpiece. In one practical application of the present invention, the tool may be a handsaw and the workpiece may be a piece of material such as wood, metal, plastic, or the like. A miter apparatus according to an embodiment of the present invention has an element to engage the workpiece in predetermined alignment, and a guide member moveably attached to the element and having a bearing region for guiding the tool along a certain path relative to that predetermined alignment. The guide member is selectably positionable at a number of positions with respect to the element, so as to align the bearing region of the guide member on a desired angle relative to a workpiece with which the element is aligned. The guide member provides a bearing surface against which a handsaw or other tool can move while cutting the workpiece.

Stated in somewhat greater detail, an apparatus according to the disclosed embodiment comprises a base element having a seat configured to fit in predetermined alignment with a workpiece, and a guide carried by the base element and moveable to a plurality of selectable alignments with respect to the seat. The guide defines a bearing surface for guiding a path of cut with respect to the workpiece. Each selectable alignment of the guide relative to the seat thus places the bearing surface at a different predetermined path of cut with respect to the workpiece, so that a user can selectably align the guide with respect to the base without interference from a workpiece with which the seat is aligned. The bearing surface is comprised, at least in part, by a surface of the pivotable member, which extends outwardly from the base in substantially perpendicular alignment to the seat in the disclosed embodiment. The guide may also be moved to an inactive position substantially aligned with the base, so that the apparatus occupies a minimum volume suitable for storage, e.g., in a tool belt or the like.

Stated in further detail, a miter guide apparatus according to a preferred embodiment of the invention includes a seat angled to fit against the workpiece to be cut and having sufficient length for extending a distance along that workpiece. A guide member is pivotably attached to the seat and has a bearing surface for guiding a handsaw along a predetermined path, such that the predetermined path of cut relative to the workpiece is determined by the angle of the guide member relative to the seat. A knurl or other suitable knob selectably secures the guide member relative to the seat, thereby maintaining the guide member at a selected angle relative to the seat. The knurl preferably has a bearing surface coplanar with the bearing surface of the guide member, so that both bearing surfaces are aligned for guiding a saw along the predetermined path of cut. An upright member extends from the base member at an end remote from the pivotable attachment to the seat, and a surface of the base member forms another portion of the bearing surface for guiding the saw. The guide member preferably has a finger guard between the upright member and the knurl, interposed between a saw and the user's hand holding the miter apparatus against a workpiece.

Other objects and advantages of the present invention will become apparent from the following description of the disclosed embodiment.

BRIEF DESCRIPTION OF DRAWINGS

FIG. 7 is a front elevation view as in FIG. 1, and showing the disclosed embodiment folded to the closed position.

FIG. 8 is an elevation view taken from the right side of FIG. 7.

FIG. 9 is a top view of the embodiment as shown in FIG. 7.

DETAILED DESCRIPTION OF PREFERRED EMBODIMENT

Figure 3:
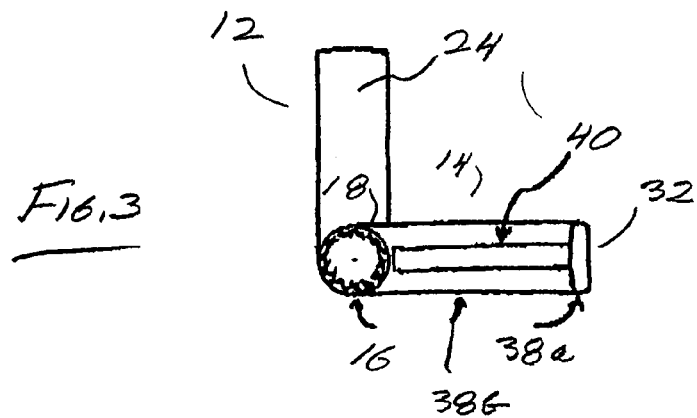
FIG. 3 is a top view of the embodiment shown in FIG. 1
Figure 1:
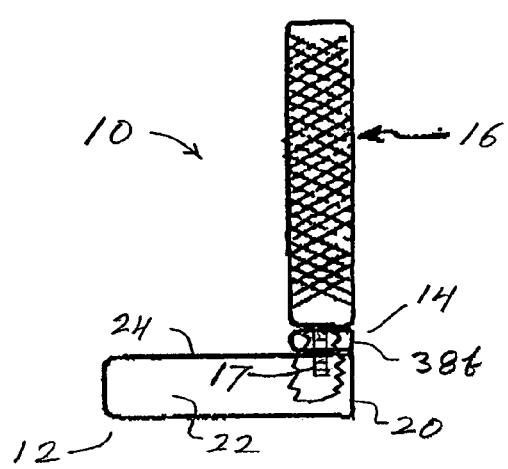
FIG. 1 is a front elevation view, partially cut away for illustration, of a compact miter apparatus according to a disclosed embodiment of the present invention.
Figure 2:
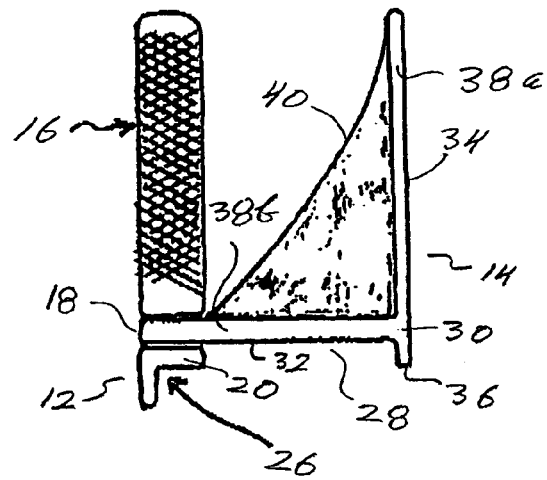
FIG. 2 is a right side elevation view of the embodiment shown in FIG. 1.

Turing first to FIGS. 1–3, a compact miter apparatus 10 according to a disclosed embodiment of the invention comprises a base 12 and a guide member 14 pivotably attached to one end of the base 12. The pivotable attachment between the base 12 and the guide member 14 is provided in the disclosed embodiment by a knurl 16 having a threaded portion 17 of reduced diameter, extending through an opening provided at an end 18 of the guide member 14 proximal to an end 20 of the base. That end 17 of reduced diameter makes threaded engagement with a mating opening in or through the base 12 adjacent the end 20. (The term "knurl" is used herein, unless the context indicates otherwise, in the meaning of a knob or small protuberance.)

The base 12 of the disclosed embodiment has a front portion 22 joining a top portion 24 to provide an L-shaped interior angle defining a seat 26, best seen in FIG. 2. The disclosed configuration of the base 12 thus adapts the miter apparatus 10 to fit against a workpiece such as a board, as described below in greater detail.

The guide member 14 has a foot 28 having the end 18 pivotally attached to the base 12, as previously mentioned, and the foot 28 extends outwardly to a distal end 30 spaced a distance apart from the base 12. The foot 28 has a lower surface 32 preferably flat and contiguous to an outer surface on the top portion 24 of the base 12, so that the guide member 14 may be pivoted to a closed position substantially overlying and aligned with the base 12, as shown in FIGS. 7–9 and described below.

The base 12 further includes an upright portion 34 joining the foot 28 at the distal end 30, preferably at approximately a right angle with respect to the foot 28. A lower end of the upright portion 34 preferably extends below the lower surface 32 of the foot 28 to provide a toe 36. The lowermost extent of the toe 36 preferably is substantially coplanar with an underside of the top portion 24 comprising the base 12, so that the underside and the toe 36 provide a level support of the miter apparatus 10 against a board or other workpiece in use, as will be described below.

Figure 4:
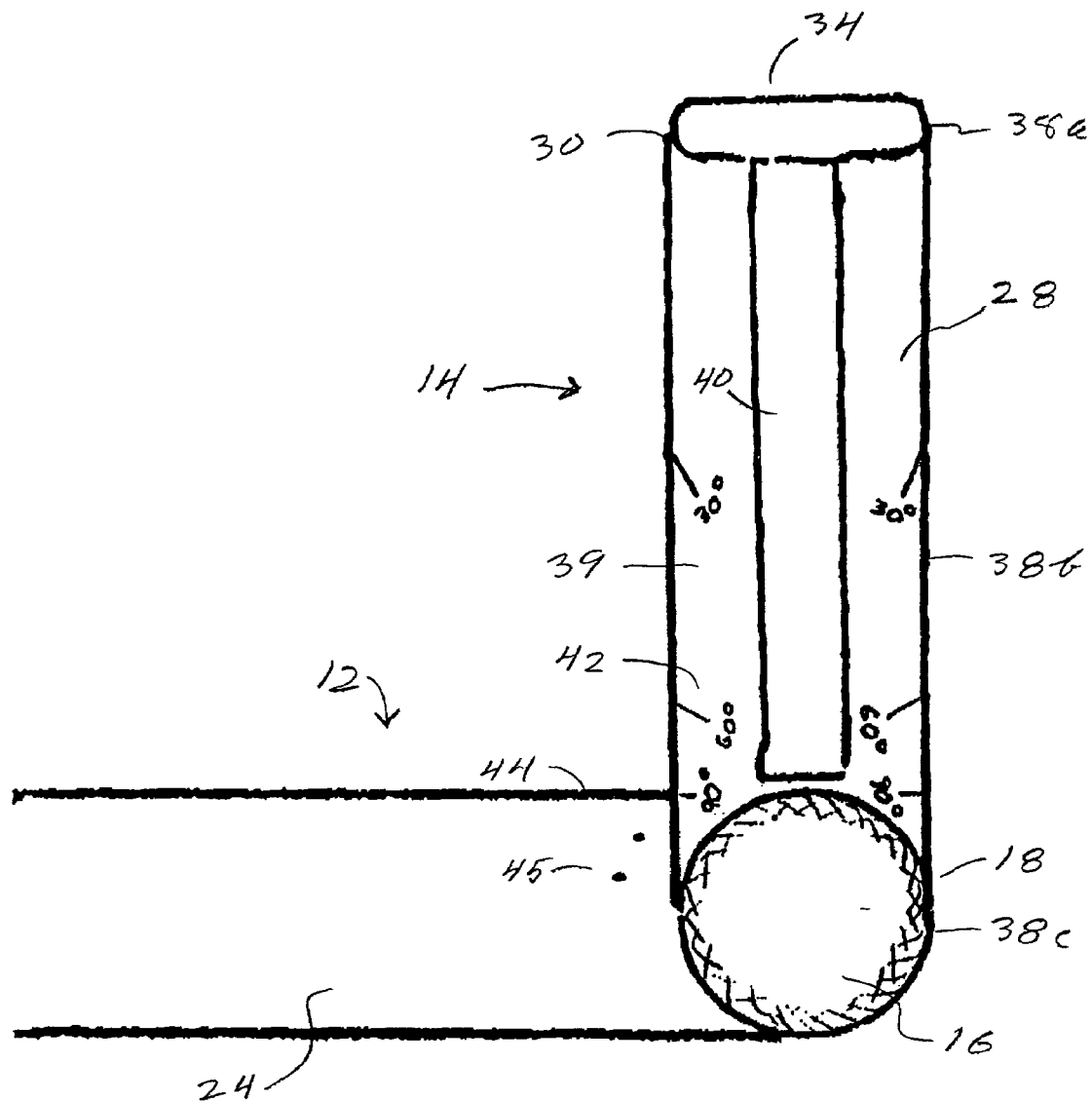
FIG. 4 is an enlarged top view of the disclosed embodiment showing indicia marked on the apparatus for selecting primary angles of miter cuts.

The upright portion 34 has an outer side surface 38a that is coplanar with an outer side surface 38b of the foot 28. That coplanar alignment of the side surfaces 38a and 38b is best seen in FIG. 4. Also in that figure, it can be seen that the diameter and the positioning of the knurl 16 is such that a periphery 38c of the knurl is coplanar with the side surfaces 38a and 38b. The surfaces 38a–38c provide a generally U-shaped bearing surface, as best understood from FIG. 2, against which a tool such as a saw blade or the like may rest while performing a miter cut guided by the miter apparatus 10.

The guide member 14 has a rib 40 formed by a web extending between the upper surface of the foot 28 and the inner surface of the upright portion 34. The rib 40 is spaced inwardly from the side surfaces 38a and 38b of the foot 28 and the upright portion 34, as best seen in FIG. 4. The rib 40 serves the dual purposes of strengthening the guide member 14 and, more importantly, being interposed between the saw blade and a user's fingers and hand while making a miter cut with the apparatus 10.

The miter apparatus 10 may be provided with indicia 42 for assisting the user in adjusting the guide member 14 for the primary miter-cut angles of 90°, 60°, 45°, and 300. These indicia 42, best shown in FIG. 4 in the disclosed embodiment, are etched or otherwise marked onto an upper surface 39 of the foot 28, including indicia marks that align with an outer edge 44 of the top portion 24 on the base 12. The miter apparatus 10 may also include positive stops such as detents 45, appearing in FIG. 4 on the top portion 24 of the base 12, for engaging complementary structure on the foot 28 of the guide member 14 so as to click the guide member 14 into appropriate angular alignment with the base 12 for the aforementioned primary angles or other angular positions.

The exterior of the knurl 16 is provided with a finish that assists in gripping the knurl 16 to loosen or tighten the pivotable interconnection between the base 12 and the guide member 14. That exterior surface preferably is equipped with a series of small ridges or grooves to aid in gripping, although other exterior finishes or shapes may be substituted. In any case, the knurl 16 should have an overall outer dimension providing the periphery 38c coplanar with the corresponding surfaces 38a and 38b, respectively on the upright portion 34 and the foot 28 of the guide member 14.

The operation of the miter apparatus 10 is now described with reference to FIGS. 5 and 6. Assuming a user desires to cut a workpiece such as a board 50, the user first adjusts the miter apparatus 10 so that the guide member 14 is set relative to the base 12 to provide the desired angle of cut. In the examples shown on FIGS. 5 and 6, that angle is 90°, that is, perpendicular to the length of the board 50. After setting the desired angle of cut, the user next places the base 12 against a corner edge 52 of the board 50, so that the edge 52 fits snugly against the seat 26 formed on the underside of the base 12. The side surfaces 38a and 38b and periphery-38c are thus aligned with the desired line of cut across the board 50. The toe 36 and the underside of the top portion 24 engage the top of the board 50 at this time, maintaining the miter apparatus 10 substantially level on the board 50. Holding the base 12 against the board 50 with one hand as shown in FIG. 6, the user may then cut the board 50 with a tool such as a conventional handsaw 54 or the like. The side surfaces 38a and 38b and periphery-38c of the miter apparatus 10 abut the confronting side of the saw 54, guiding that saw 54 for cutting the board 50 along the desired angle to which the miter apparatus 10 was previously set. During the cutting operation, the user maintains the miter apparatus 10 in position by pressing the base 12 against the board 50 with the thumb of one hand while pressing downwardly against the upper surface 39 of the guide member 14 with one or more fingers of that hand. The rib 40 helps protect the user's fingers from interaction with the teeth of the saw blade 54 during the cutting operation.

Figure 5:
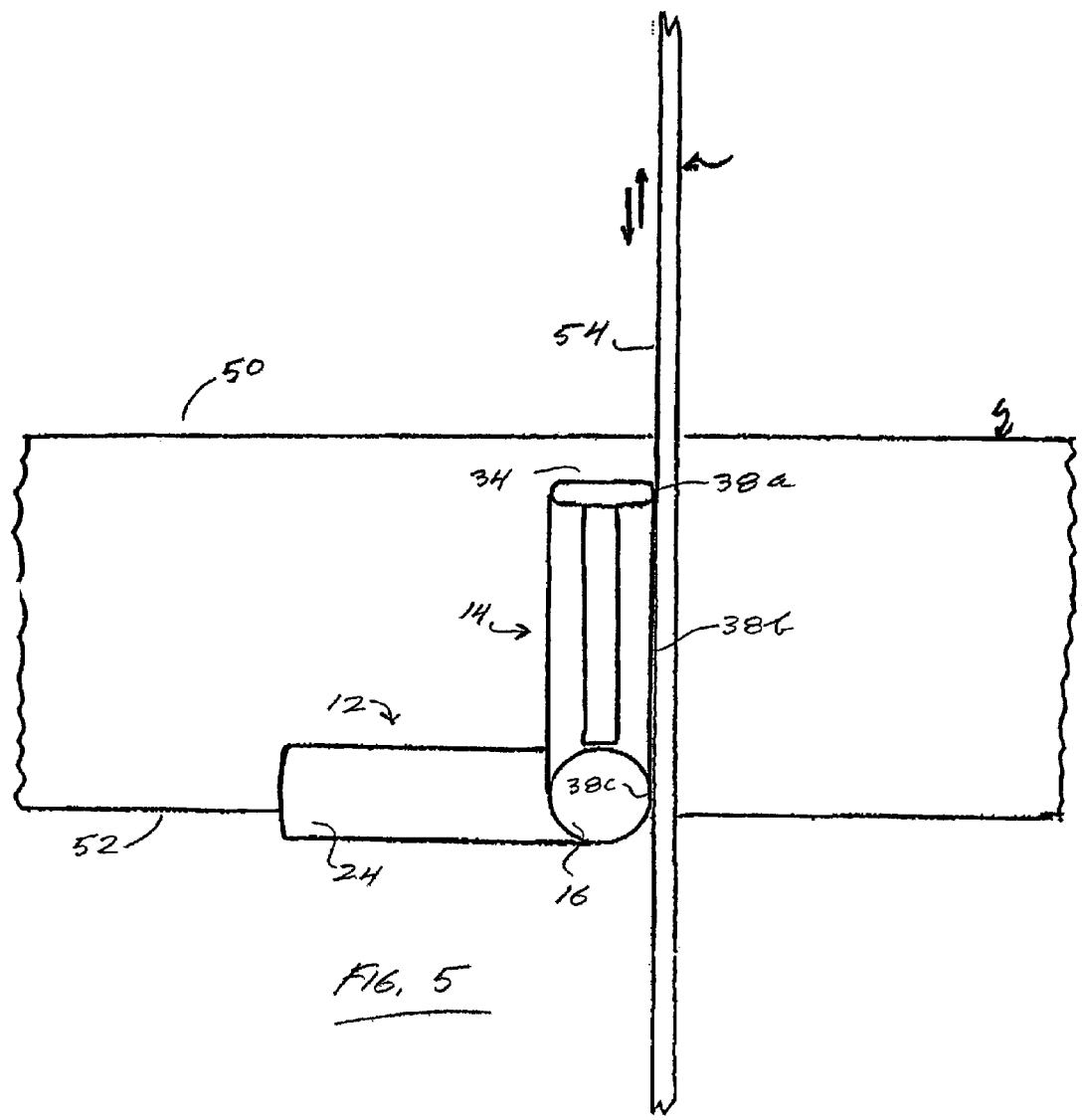
FIG. 5 is a top view showing the disclosed embodiment in use.
Figure 6:
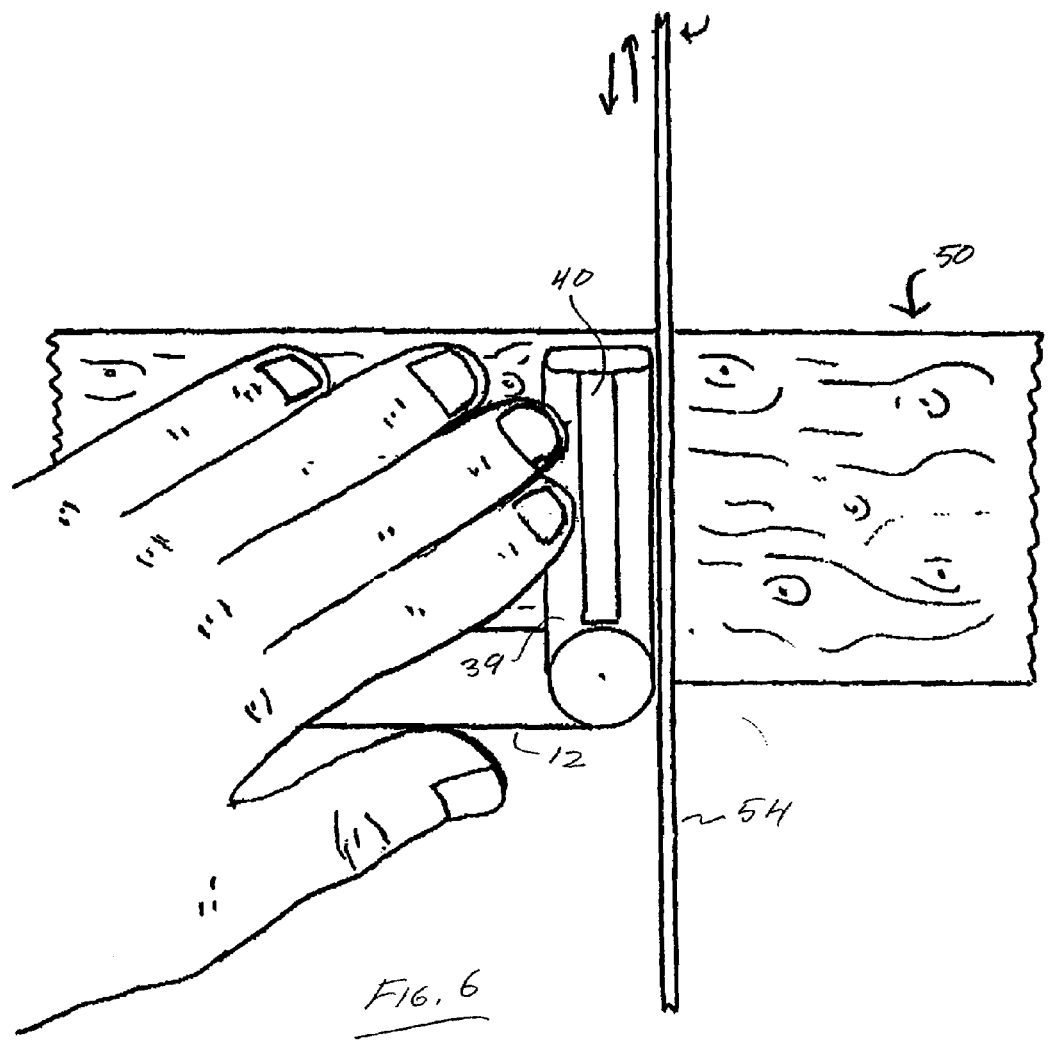
FIG. 6 is a top view as in FIG. 5, showing a user holding the embodiment against a workpiece being cut.

Although the illustrative example of use shown in FIGS. 5 and 6 depict a 90° cut, it should be obvious that miter cuts using other angles are readily obtained by temporarily loosening the knurl 16 and repositioning the angle of the guide member 14 with respect to the base 12. It should also be understood that any desired angle of cut may be set with the present apparatus 10, not only those primary angles that may be indicated by the indicia 42 on the apparatus 10.

When the miter apparatus 10 is not in use, it may be folded to a relatively compact configuration to stow the apparatus 10 in a pocket, a tool belt, or elsewhere. This folded position is best shown in FIGS. 7–9. To achieve the folded position, the user need only loosen the knurl 16 and pivot the guide member 14 until the foot 28 is aligned with the top portion 24 of the base 12. This alignment is best shown in FIG. 8. By retightening the knurl 16, the miter apparatus 10 remains held in that folded position. As best seen in FIG. 8, the length of the foot 28 is slightly longer than the length of the confronting top portion 24 of the base 12 so that the toe 36 of the upright portion 34 extends over the adjacent end of the top portion 24.

It should now be apparent that the present miter apparatus 10 avoids many problems associated with the conventional miter box of the prior art. The present apparatus 10 is relatively compact and easy to keep at hand, and is not limited only to cuts along predetermined angles. Furthermore, the present miter apparatus 10 is less likely to undergo damage during routine use, because the teeth of the handsaw are not directed to any part of that apparatus 10.

It should be understood that the foregoing relates only to a disclosed embodiment of the present invention, and that numerous changes of modifications thereto and may be made without departing from the spirit and scope of the invention as defined in the following claims.

We claim:

1. A miter apparatus for guiding a predetermined path of cut along a surface of a workpiece, the apparatus comprising:

a base element having an angled element configured to fit in predetermined alignment against a corner joining the surface of the workpiece, so that the base element is thereby in predetermined alignment with the workpiece surface;

a guide member pivotably mounted on the base element and movable to a plurality of selectable alignments with respect to the base element;

a first bearing surface defined by the guide member and operative to guide a path of cut with respect to the surface of the workpiece, so that each selectable alignment of the guide member relative to the base element places the bearing surface at a different predetermined path of cut with respect to the surface of the workpiece; and an element protruding outwardly from the guide member in substantially upright relation to the guide member and to the surface of the workpiece against which the base element is aligned, the protruding element having a second bearing surface in coplanar alignment with the first bearing surface defined by the guide member, so that the coplanar first and second bearing surfaces define the predetermined path of cut with respect to the workpiece surface.

2. The apparatus as in claim 1, wherein:

the guide member is pivotably mounted on the base element and spaced apart from the seat, so that the guide member can undergo selectable alignment with respect to the base element without interference with a workpiece in predetermined alignment with the angled element.

3. The apparatus as in claim 2, wherein:

the guide member extends outwardly from the base element in spaced apart relation to the angled element so as to extend outwardly from the surface of the workpiece on which the seat angled element fits; and the guide means member is selectably operative for movement moveable to an inactive position substantially aligned with the base element so that the first bearing surface is no longer at a predetermined path of cut and is instead substantially aligned parallel to the base element, whereby the apparatus occupies a minimum volume suitable for storage.

4. The apparatus as in claim 1, wherein the guide means member has a proximal end at the pivotable mount on the base element and extends from the proximal end to a distal end relative to the pivotable mount; and the outwardly protruding element extends outwardly from the proximal end of the guide member with the second bearing surface in substantial alignment with the first bearing surface of the guide means, whereby the second bearing surface of the protuberance extends at substantially a perpendicular to the guide member and combines with the bearing surface of the guide means provide support for one side of a saw cutting the workpiece along the predetermined path of cut with respect to the workpiece.

5. The apparatus as in claim 4, wherein:

the pivotable mounting of the guide element with respect to the base element comprises a pivot element at the proximal end and selectably operable to hold the guide means element at a predetermined alignment relative to the base element; and the outwardly protruding element is operatively associated with the pivot element so as to selectably release the guide means for movement relative to the base element.

6. The apparatus as in claim 5, wherein:

the pivot element comprises a first part engaging one of the base element and the guide element, and a second part engaging the other of the base element and the guide element so as to selectably secure the guide means against movement relative to the base element;

the outwardly protruding element comprises a knob operatively connected to either the first part or the second part; and the second bearing surface comprises an exterior portion of the knob in coplanar alignment with the first bearing surface.

7. The apparatus as in claim 6, wherein:

the exterior portion of the knob is configured to provide a gripping surface for manually manipulating the knob.

8. The apparatus as in claim 4, wherein:

the guide member is disposed on the base element and has a lower surface in spaced apart relation relative to the angled element and to the surface of the workpiece, so that the guide member is spaced apart from the surface of the workpiece; and further comprising a toe member adjacent the distal end of the guide member and extending below the lower surface and extend to contact the surface of the workpiece, so that the toe member and the base element support the guide member in substantially level relation to the surface.

9. A miter apparatus for guiding a predetermined path of cut along a workpiece, the apparatus comprising:

a seat providing a substantially L-shaped portion configured to fit in predetermined relation against a corner of the workpiece to be cut and having a length for extending a distance along that corner;

a guide member pivotably attached to the seat and having a bearing surface for guiding a saw along a predetermined path, whereby the predetermined path of cut relative to the workpiece is determined by the angle of the guide member relative to the seat;

a knurl securing the guide member relative to the seat so as to maintain a selected angle of the guide member relative to the seat; and the knurl having a bearing surface in coplanar alignment with the bearing surface of the guide member so as to guide the saw along the predetermined path of cut.

10. The apparatus as in claim 9, wherein:

the guide member is pivotably attached to the seat at a proximal end and extends to a distal end; and further comprising an upright member extending outwardly from the distal end of the guide member and having an additional bearing surface coplanar with the bearing surfaces of the guide member and the knurl.

11. The apparatus as in claim 10, further comprising:

a rib extending between the upright member and the guide member in position between the bearing surface of the guide member and a side of the bearing member opposite the bearing surface, so that the rib is interposed between the opposite side of the guide member and a saw guided by the bearing surface of the guide member.

12. The apparatus as in claim 11, wherein the rib is spaced behind the bearing surface of the guide member so as not to interfere with a saw guided by the bearing surface.

13. The apparatus as in claim 12, wherein;

the guide member is disposed in relation to the seat so as to be substantially out of contact with a workpiece on which the seat is received, so as not to interfere with positioning the miter apparatus on the workpiece; and a toe member is disposed at the distal end of the guide member facing the workpiece on which the seat is received and in substantial alignment with the L-shaped portion of the seat, whereby the seat and the toe member provide substantial support for the miter apparatus on the workpiece.

14. The apparatus as in claim 13, wherein the extent of the guide from the pivotable attachment to the distal end is sized in relation to an end of the seat remote to the pivotable attachment, so that the base member guide is pivotable to substantially overlay the seat in a stowed configuration.

15. The apparatus as in claim 8, wherein:

the lower surface of the guide member faces an upper surface of the base element on which the guide member is pivotably mounted; and the toe member is located on the underside of the guide member a sufficient distance from the pivotable mount so as not to interfere with pivotable movement of the guide member to a position substantially parallel to the base element, whereby the base element and support member occupy a minimum volume suitable for storage.

\* \* \* \* \*